US011151572B2

(12) United States Patent
Jain et al.

(10) Patent No.: US 11,151,572 B2
(45) Date of Patent: Oct. 19, 2021

(54) SYSTEM AND METHOD FOR ELECTRONIC PAYMENT ON DELIVERY

(71) Applicant: Mastercard International Incorporated, Purchase, NY (US)

(72) Inventors: Navneet Jain, Pune (IN); Arunmurthy Gurunathan, Pune (IN); Sonal Vishwas Khanvilkar, Pune (IN); Rohit Mali, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 194 days.

(21) Appl. No.: 16/163,649

(22) Filed: Oct. 18, 2018

(65) Prior Publication Data

US 2019/0122216 A1  Apr. 25, 2019

(30) Foreign Application Priority Data

Oct. 24, 2017 (SG) .......................... 10201708731U

(51) Int. Cl.
*G06Q 20/38* (2012.01)
*G06Q 20/40* (2012.01)
(Continued)

(52) U.S. Cl.
CPC ........... *G06Q 20/405* (2013.01); *G06Q 20/24* (2013.01); *G06Q 20/32* (2013.01);
(Continued)

(58) Field of Classification Search
CPC ................................................... G06Q 20/405
(Continued)

(56) References Cited

U.S. PATENT DOCUMENTS

2009/0083181 A1* 3/2009 Bishop ................. G06Q 40/025
705/41
2009/0177563 A1* 7/2009 Bernstein ............... G06Q 20/04
705/30

(Continued)

*Primary Examiner* — Chinedu C Agwumezie

(57) ABSTRACT

System and method for facilitating electronic payment on delivery of a product. The system includes a merchant device; a manufacturer device that is in communication with the merchant device; and a courier device that is in communication with the merchant device. The merchant device is configured to: receive, from an issuer device that is in communication with the merchant device, a pre-authorization code in response to a request for pre-authorization of a transaction corresponding to an electronic payment request for the product; and generate a first machine-readable code having encoded thereon at least the pre-authorization code and an identifier corresponding to the product. The manufacturer device is configured to generate a second machine-readable code having encoded thereon at least the pre-authorization code and the identifier corresponding to the product. The courier device is configured to: generate a third machine-readable code having encoded thereon at least the pre-authorization code and the identifier corresponding to the product; and transmit, to the issuer device, an instruction to either (i) complete an authorization of the transaction or (ii) cancel the pre-authorization of the transaction, based on a comparison of the pre-authorization code and the identifier corresponding to the product that are encoded on the first, second and third machine-readable codes during delivery of the product.

20 Claims, 4 Drawing Sheets

(51) Int. Cl.
*G06Q 20/32* (2012.01)
*G06Q 20/24* (2012.01)

(52) U.S. Cl.
CPC ..... *G06Q 20/3223* (2013.01); *G06Q 20/3276* (2013.01); *G06Q 20/385* (2013.01); *G06Q 20/388* (2013.01); *G06Q 20/40* (2013.01)

(58) Field of Classification Search
USPC .......................................................... 705/77
See application file for complete search history.

(56) References Cited

U.S. PATENT DOCUMENTS

| | | | |
|---|---|---|---|
| 2009/0299841 A1* | 12/2009 | Bishop | G06Q 30/0238 705/14.21 |
| 2016/0063435 A1* | 3/2016 | Shah | G06Q 20/42 705/44 |

* cited by examiner

SYSTEM AND METHOD FOR ELECTRONIC PAYMENT ON DELIVERY

CROSS REFERENCE TO RELATED APPLICATIONS

This application claims priority to Singaporean Application Serial No. 10201708731U, filed Oct. 24, 2017, which is incorporated herein by reference in its entirety.

FIELD OF INVENTION

The present disclosure relates to systems and methods for electronic payment on delivery.

BACKGROUND

Currently, rather than visiting brick and mortar stores, many consumers are purchasing their products online (e.g. via a merchant's e-commerce website) because of the relative ease of making online transactions. This has led to a significant increase in the number of online merchants and online transactions.

Many consumers use electronic payments (e.g. payment cards or digital wallets) for their online transactions. However, many consumers do not wish to pay merchants for online purchases until the consumers are satisfied with the delivered products. This is because the delivered products may not be identical to the products that they had bought (e.g. wrong colour, wrong size etc.). The delivered products may also be defective (e.g. manufacturing defects or damage during delivery). By paying upfront for the purchased products, consumers face a tedious process to exchange their delivered products or to obtain a refund when such problems arise.

Although "cash-on-delivery" methods allow consumers to make payment on delivery rather than in advance (e.g. a courier service has a mobile point-of-sale terminal), consumers have to be physically present at the time of delivery to present their payment cards for payment.

A need therefore exists to provide a method and system for electronic payment on delivery that seeks to address at least some of the above problems.

SUMMARY

According to a first aspect, there is provided a system for facilitating electronic payment on delivery of a product. The system includes a merchant device; a manufacturer device that is in communication with the merchant device; and a courier device that is in communication with the merchant device. The merchant device is configured to: receive, from an issuer device that is in communication with the merchant device, a pre-authorization code in response to a request for pre-authorization of a transaction corresponding to an electronic payment request for the product; and generate a first machine-readable code having encoded thereon at least the pre-authorization code and an identifier corresponding to the product. The manufacturer device is configured to generate a second machine-readable code having encoded thereon at least the pre-authorization code and the identifier corresponding to the product. The courier device is configured to: generate a third machine-readable code having encoded thereon at least the pre-authorization code and the identifier corresponding to the product; and transmit, to the issuer device, an instruction to either (i) complete an authorization of the transaction or (ii) cancel the pre-authorization of the transaction, based on a comparison of the pre-authorization code and the identifier corresponding to the product that are encoded on the first, second and third machine-readable codes during delivery of the product.

According to a second aspect, there is provided a method for facilitating electronic payment on delivery of a product. The method includes: receiving, at a merchant device from an issuer device, a pre-authorization code in response to a request for pre-authorization of a transaction corresponding to an electronic payment request for the product; generating, by the merchant device, a first machine-readable code having encoded thereon at least the pre-authorization code and an identifier corresponding to the product; generating, by a manufacturer device that is in communication with the merchant device, a second machine-readable code having encoded thereon at least the pre-authorization code and the identifier corresponding to the product; generating, by a courier device that is in communication with the merchant device, a third machine-readable code having encoded thereon at least the pre-authorization code and the identifier corresponding to the product; and transmitting, from the courier device to the issuer device, an instruction to either (i) complete an authorization of the transaction or (ii) cancel the pre-authorization of the transaction, based on a comparison of the pre-authorization code and the identifier corresponding to the product that are encoded on the first, second and third machine-readable codes during delivery of the product.

BRIEF DESCRIPTION OF THE DRAWINGS

Embodiments will be better understood and readily apparent to one of ordinary skill in the art from the following written description, by way of example only, and in conjunction with the drawings, in which.

DETAILED DESCRIPTION

Figure 1:
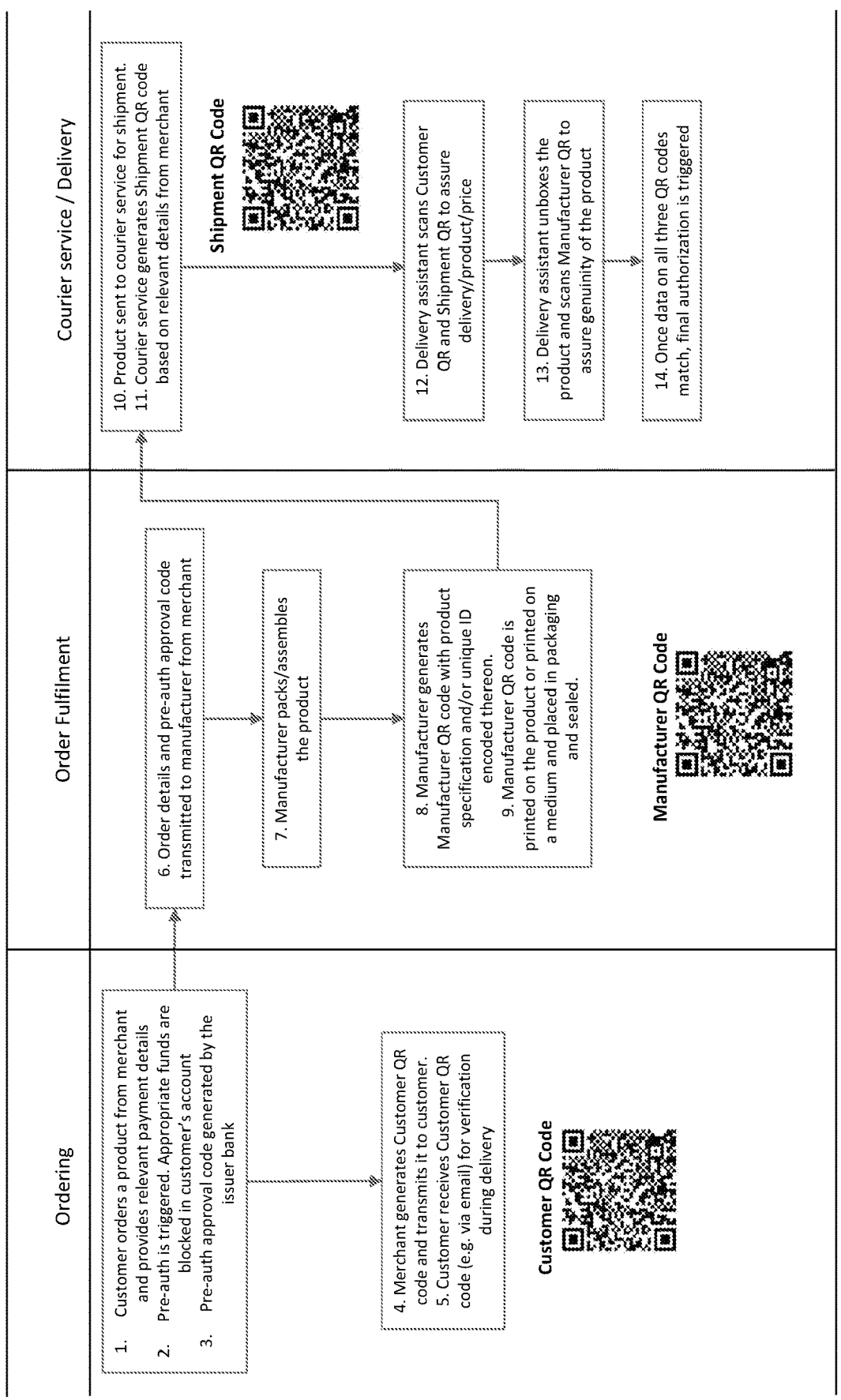
FIG. 1 shows a flow chart illustrating a method for electronic payment on delivery, according to an example embodiment.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "identifying", "authorizing", "verifying" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

In the following description, depending on the context, the term "module" can refer to software, a hardware element, or a combination of both.

In the following description, a "digital wallet" refers to software and/or hardware elements that allow a consumer to make electronic transactions. This can include purchasing items using a mobile device (e.g. smartphone) with a digital wallet application installed thereon. The consumer's bank account can be linked to the digital wallet.

In the following description, pre-authorization (also known as "authorization hold", "card authorization", or "pre-auth") is the practice of authorizing an electronic transaction that is done with a payment card (e.g. a debit card or credit card) and holding this balance as unavailable until either the merchant completes/clears the transaction, or the hold falls off after a pre-determined period of time.

Embodiments relate to systems and methods for facilitating electronic payment on delivery of products. In particular, a plurality of machine-readable codes (e.g. QR codes) contain data that is used to authenticate the purchased product at the time of delivery. Each code is associated with a key entity in the purchase-delivery process (e.g. merchant, manufacturer and delivery service).

The systems and methods for facilitating electronic payment on delivery of products as described herein may result in improved trust between a consumer and a merchant. Pre-authorization of a transaction allows the consumer to withhold payment of the transaction until a product is delivered to a recipient. On the other hand, unlike "cash-on-delivery", the merchant is provided with a preliminary assurance of payment by the consumer. Advantageously, embodiments can be used without the need for a physical payment card, mobile point-of-sale (POS) terminal and user's smartphone at the time of delivery.

FIG. 1 shows a flow chart illustrating a method for electronic payment on delivery, according to an example embodiment. At step 1, a customer (cardholder) logs in to an electronic-commerce website of a merchant. The customer selects the product(s) he wishes to purchase and adds them into a virtual shopping cart at the website. Once he is done, the consumer reviews the products in the virtual shopping cart and initiates payment for the products by selecting a desired electronic payment method (e.g. by providing his payment card details or using a digital wallet application).

At step 2, pre-authorization is triggered and the issuer of the payment card determines sufficiency of funds in the customer's account for payment of the product(s) that the customer wishes to purchase. If the issuer determines there are insufficient funds in the customer's account, the issuer sends a rejection message for display at the website. In this case, the customer can amend the products in the virtual shopping cart so that there are sufficient funds to purchase the products, or the consumer can stop shopping. On the other hand, if the issuer determines that there are sufficient funds in the user's account, the appropriate funds corresponding to the price of the purchased product(s) are blocked in the customer's account (i.e. balance is held as unavailable) for a pre-determined amount of time. The validity period of the pre-authorization may vary. For example, the pre-authorization can expire between 2 to 21 days and thus, the delivery of the products can be made before the expiration of the pre-authorization.

At step 3, the issuer generates a pre-authorization code after the appropriate funds are blocked.

At step 4, the merchant receives the pre-authorization code from the issuer and generates a Customer QR code and transmits the Customer QR code to the customer (e.g. via an email). The Customer QR code has one or more of the following data encoded thereon: —(i) the pre-authorization code, (ii) specification of each purchased product (colour, size, version, etc.), (iii) payment details (e.g. transaction number, transaction amount, etc.), (iv) details of each purchased product (country of manufacture, stock keeping unit (SKU) code, a unique identifier, etc.), (v) customer details (name, billing address, contact details, etc.), and/or (vi) shipping/delivery details (e.g. delivery date/time, delivery address, etc.). In this exemplary embodiment, a QR code is generated. However, in other implementations, any other machine-readable code (e.g. 2D barcode) can be generated instead.

At step 5, the customer receives the Customer QR code and saves it for subsequent verification during delivery (see step 12 below).

At step 6, after the issuer generates the pre-authorization code, the merchant transmits the product order details and pre-authorization code to the manufacturer of the product(s). In this exemplary embodiment, the merchant and manufacturer are separate entities. The merchant only offers products for sale to the customer; while the manufacturer makes, assembles, keeps stock and/or packages the products. The merchant and the manufacturer may belong to a single company but are in separate departments—one department handles sales while another department handles manufacturing, stocking and packaging. If the customer purchases a plurality of products from different merchants, the merchant transmits the respective product order details and pre-authorization code to each of the manufacturers.

At step 7, the manufacturer packs and/or assembles the product after receiving the product order details and pre-authorization code from the merchant.

At step 8, the manufacturer generates a Manufacturer QR code. The Manufacturer QR code has one or more of the following data encoded thereon: —(i) pre-authorization code (that was transmitted by the merchant at step 6 and is the same pre-authorization code encoded on the Customer QR code), (ii) specification of each purchased product (colour, size, version, etc.), (iii) details of each purchased product (country of manufacture, stock keeping unit (SKU) code, a unique identifier, etc.), (iv) shipping/delivery details (e.g. delivery date/time, delivery address, etc.), (v) manufacturing/assembly date, and/or (vi) manufacturer details (name, address, etc.). In this exemplary embodiment, a QR code is generated. However, in other implementations, any other machine-readable code (e.g. 2D barcode) can be generated instead.

At step 9, the Manufacturer QR code is printed on the product itself (if possible) by the manufacturer or printed on a medium (e.g. a piece of paper) and placed inside a packaging of the product (e.g. inside a cardboard box containing the product) and thereafter the packaging is sealed to prevent unauthorized tampering.

At step 10, the manufacturer sends the product to a courier service for shipment to the customer. Alternatively, the courier service picks the product up from the manufacturer.

At step 11, the courier service generates a Shipment QR code. The Shipment QR code has one or more of the following data encoded thereon: —(i) pre-authorization code (the same pre-authorization code encoded on the Customer QR code and the Manufacturer QR code), (ii) product name, (iii) customer details (name, billing address, contact details, etc.), and/or (iv) shipping/delivery details (e.g. delivery date/time, delivery address, etc.). The data encoded on the Shipment QR code is transmitted by the merchant to the courier service. In this exemplary embodiment, a QR code is generated. However, in other implementations, any other machine-readable code (e.g. 2D barcode) can be generated instead.

At step 12, the courier service delivers the products to the customer within the validity period of the pre-authorization (e.g. 7 days). Before hand-over of the products to the customer, the delivery assistant uses a QR code reader to scan the Customer QR code that is provided by the customer. The delivery assistant also uses the QR code reader to scan the Shipment QR code that is with the delivery assistant. The scanning of both codes is preferably carried out in the presence of the customer so that both the delivery assistant and customer can see the data encoded on each of the Customer QR code and the Shipment QR code. In this manner, if there is a match between the data encoded on the Customer QR code and the Shipment QR code, the customer can be assured that the product that was purchased is correct (e.g. correct specification, colour, version, size, price, etc.).

At step 13, the delivery assistant breaks the seal of the package and unboxes the product. The delivery assistant uses the QR code reader to scan the Manufacturer QR code that is inside the sealed package. Again, the scanning of the Manufacturer QR code is preferably carried out in the presence of the customer so that both the delivery assistant and customer can see the data encoded on the Manufacturer QR code. In this manner, if there is a match between the data encoded on the Manufacturer QR code, the Customer QR code and the Shipment QR code, the customer can be assured that the product that was delivered is genuine (i.e. made or assembled by the manufacturer) because it is assumed that only the manufacturer could have generated a QR code having the matching data and placed the code inside the sealed package.

At step 14, if the data encoded on the Manufacturer QR code matches the data encoded on the Customer QR code and the Shipment QR code, final authorization is triggered (i.e. completion of the pre-authorization is initiated). In an implementation, the QR code reader can be configured to compare and match the data encoded on the scanned Manufacturer QR code, Customer QR code and Shipment QR code. If there is a match, the QR code reader can be further configured to trigger the final authorization assuming that the QR code reader is in communication with a centralized courier device (or, depending on payment network configuration, a merchant device, an issuer device or a transaction processing device). The merchant receives the pre-authorization completion instruction from the courier service and in turn instructs the issuer. The issuer debits the total price of the transaction from the customer's account. The merchant receives payment for the products at a later time.

On the other hand, if the data encoded on the Manufacturer QR code does not match the data encoded on the Customer QR code and the Shipment QR code, final authorization is not triggered (i.e. a void request for the pre-authorization is initiated). In an implementation, the QR code reader can be configured to compare and match the data encoded on the scanned Manufacturer QR code, Customer QR code and Shipment QR code. If there is no match, the QR code reader can be further configured to trigger the void request. After the courier service submits the void request (e.g. through the QR code reader), the merchant receives a pre-authorization cancellation message and sends a pre-authorization reversal message to the issuer. The issuer cancels the pre-authorization and releases the funds back into the customer's account.

Figure 2:
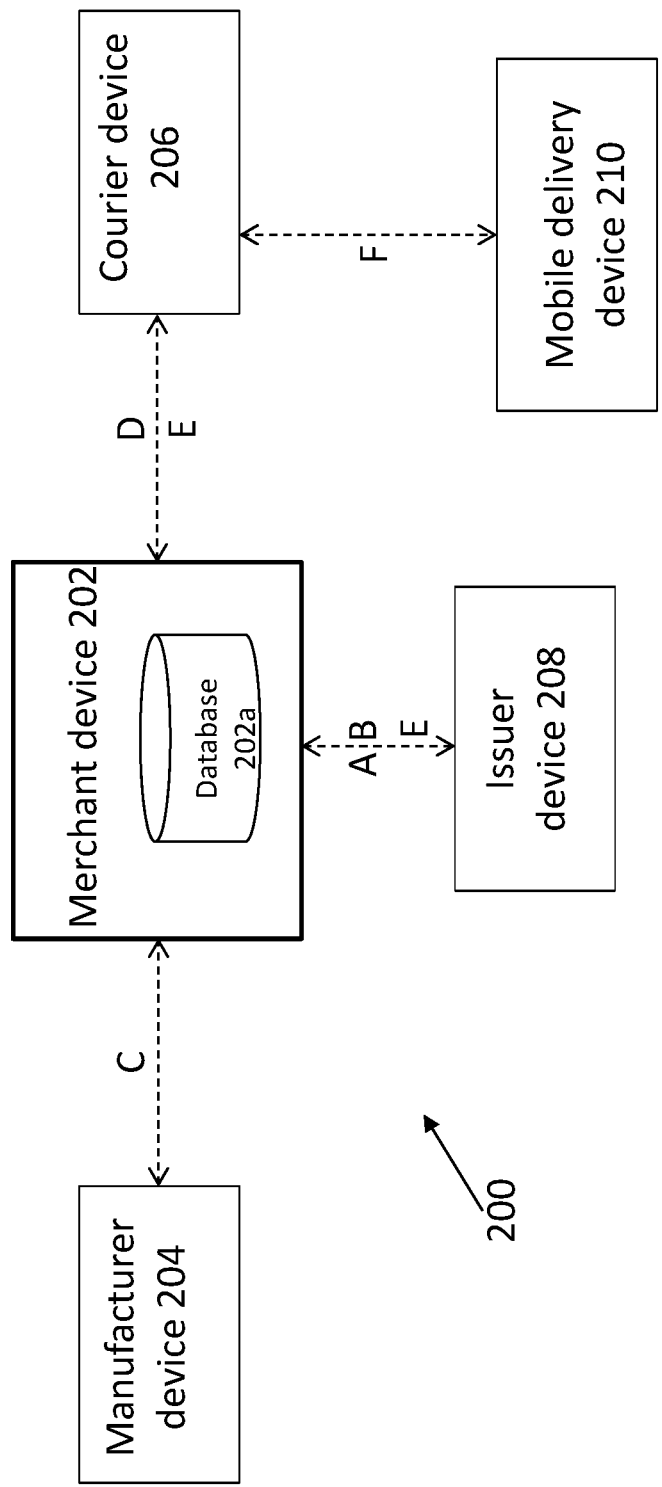
FIG. 2 shows a schematic diagram illustrating a flow of information in a system for facilitating electronic payment on delivery of a product, according to an example embodiment.

FIG. 2 shows a schematic diagram illustrating a flow of information in a system for facilitating electronic payment on delivery of a product, according to an example embodiment. The system 200 includes a merchant device 202, a manufacturer device 204, a courier device 206, and an issuer device 208. The merchant device 202 is associated with a merchant of the product and is preferably administered by the merchant. The manufacturer device 204 is associated with a manufacturer of the product and is preferably administered by the manufacturer. In this exemplary embodiment, the merchant and manufacturer are separate entities. The merchant only offers products for sale to the customer; while the manufacturer makes, assembles, keeps stock and/or packages the products. The merchant and the manufacturer may belong to a single company but are in separate departments—one department handles sales while another department handles manufacturing, stocking and packaging. For the sake of conciseness, this exemplary embodiment is described with reference to only a single merchant and a single manufacturer. It will be appreciated that the system 200 can be modified to facilitate the electronic payment on delivery of multiple products and can accommodate multiple merchants and manufacturers. In such a case, each merchant and manufacturer has its own merchant device 202 or manufacturer device 204, as the case may be.

The courier device 206 is associated with a courier service responsible for delivery of the product and is preferably administered by the courier service. The issuer device 208 is associated with an issuer of a payment card that is used for the electronic payment of the product and is preferably administered by the issuer. Similarly, for the sake of conciseness, this exemplary embodiment is described with reference to only a single courier service and a single issuer. It will be appreciated that the system 200 can be modified to accommodate multiple courier services and issuers. In such a case, each courier service and issuer has its own courier device 206 or issuer device 208, as the case may be.

As shown in FIG. 2, the manufacturer device 204 is in communication with the merchant device 202, the courier device 206 is in communication with the merchant device 202, and the issuer device 208 is in communication with the merchant device 202.

The merchant device 202 is configured to receive an electronic payment request for the product from a customer when he wishes to purchase the product online (e.g. from a merchant's e-commerce website or through a mobile application). The merchant device 202 transmits (A), to the issuer device 208, a request for pre-authorization of an electronic payment transaction corresponding to the electronic payment request for the product.

The merchant device 202 is configured to receive (B), from the issuer device 208, a pre-authorization code in response to the request for pre-authorization of the transaction corresponding to the electronic payment request for the product. The merchant device 202 is further configured to generate a first machine-readable code having encoded thereon at least the pre-authorization code (received from the issuer device 208) and an identifier corresponding to the product. The identifier corresponding to the product may be stored in a database 202a that is administered by the merchant and retrieved depending on the particular product that is being purchased by the customer.

The merchant device 202 is also configured to transmit (C), to the manufacturer device 204: (i) the pre-authorization code, (ii) the identifier corresponding to the product; and optionally (iii) information corresponding to the delivery of the product. The information corresponding to the delivery of the product may be received at the merchant device 202 from an e-commerce platform that facilitates online purchase of the product. The information corresponding to the delivery of the product may include, e.g., delivery date/time, delivery address, etc. The manufacturer device 204 is configured to generate a second machine-readable code having encoded thereon the pre-authorization code, the identifier corresponding to the product, and optionally the information corresponding to the delivery of the product.

The merchant device 202 is also configured to transmit (D), to the courier device 206: (i) the pre-authorization code, (ii) the identifier corresponding to the product; and optionally (iii) the information corresponding to the delivery of the product. The courier device 206 is configured generate a third machine-readable code having encoded thereon the pre-authorization code, the identifier corresponding to the product, and optionally the information corresponding to the delivery of the product.

The courier device 206 is further configured to transmit (E), via the merchant device 202 to the issuer device 208, an instruction to either (i) complete an authorization of the transaction or (ii) cancel the pre-authorization of the transaction, based on a comparison of the pre-authorization code and the identifier corresponding to the product that are encoded on the first, second and third machine-readable codes during delivery of the product. Specifically, the instruction to complete the authorization of the transaction is transmitted to the issuer device 208 on a condition that the pre-authorization code and the identifier corresponding to the product that are encoded on the first, second and third machine-readable codes match. On the other hand, the instruction to cancel the pre-authorization of the transaction is transmitted to the issuer device 208 on a condition that the pre-authorization code and the identifier corresponding to the product that are encoded on the first, second and third machine-readable codes do not match.

In an exemplary implementation, the first, second and third machine-readable codes are QR codes.

The merchant device 202 can be further configured to encode the information corresponding to the delivery of the product on the first machine-readable code. Accordingly, the courier device 206 can be further configured to transmit the instruction to either (i) complete the authorization of the transaction or (ii) cancel the pre-authorization of the transaction based on a comparison of the information corresponding to the delivery of the product that is encoded on the first, second and third machine-readable codes during the delivery of the product (i.e. in addition to the pre-authorization code and the identifier corresponding to the product).

Preferably, during the delivery of the product, a recipient of the product is in possession of the first machine-readable code, the second machine-readable code is initially disposed inside a sealed package containing the product, and a delivery personnel is in possession of the third machine-readable code.

In an implementation, a mobile delivery device 210 that is carried by the delivery personnel during delivery runs is used to compare the pre-authorization code and the identifier corresponding to the product that are encoded on the first, second and third machine-readable codes during the delivery of the product. If the first, second and third machine-readable codes also have the information corresponding to the delivery of the product encoded thereon, the mobile delivery device can be configured to compare the information corresponding to the delivery of the product encoded on the first, second and third machine-readable codes during the delivery of the product. The mobile delivery device 210 is preferably in communication with the courier device 206 and is configured to transmit (F) a result of the comparison to the courier device 206.

In the above description of the system 200, it was indicated that the merchant device 202 is associated with a merchant of the product and is administered by the merchant; the manufacturer device 204 is associated with a manufacturer of the product and is administered by the manufacturer; the courier device 206 is associated with a courier service responsible for delivery of the product and is administered by the courier service; and the issuer device 208 is associated with an issuer of a payment card that is used for the electronic payment of the product and is administered by the issuer. Further, it was indicated that the merchant and manufacturer are separate entities.

In another implementation, a single entity may act as a merchant, manufacturer and courier (e.g. an entity that adopts a "direct-to-consumer" business model) such that the entity administers the merchant device, manufacturer device and courier device. In such a case, the merchant device, manufacturer device and courier device can be integrated into a single device that includes a merchant module/sub-device, manufacturer module/sub-device and courier module/sub-device.

In yet another implementation, a single entity may act as both a merchant and a manufacturer. The entity may be a company having a sales department and a manufacturing department but outsources its product delivery to a separate entity. In such a case, the entity administers both the merchant device and manufacturer device. The merchant device and manufacturer device can be integrated into a single device that includes a merchant module/sub-device and a manufacturer module/sub-device. The separate entity that handles product delivery administers the courier device.

In yet another implementation, a single entity may act as both a merchant and a courier. The entity may be a company having a sales department and a product delivery department but outsources its product manufacturing to a separate entity. In such a case, the entity administers both the merchant device and courier device. The merchant device and courier device can be integrated into a single device that includes a merchant module/sub-device and a courier module/sub-device. The separate entity that handles product manufacturing administers the manufacturer device.

Figure 3:
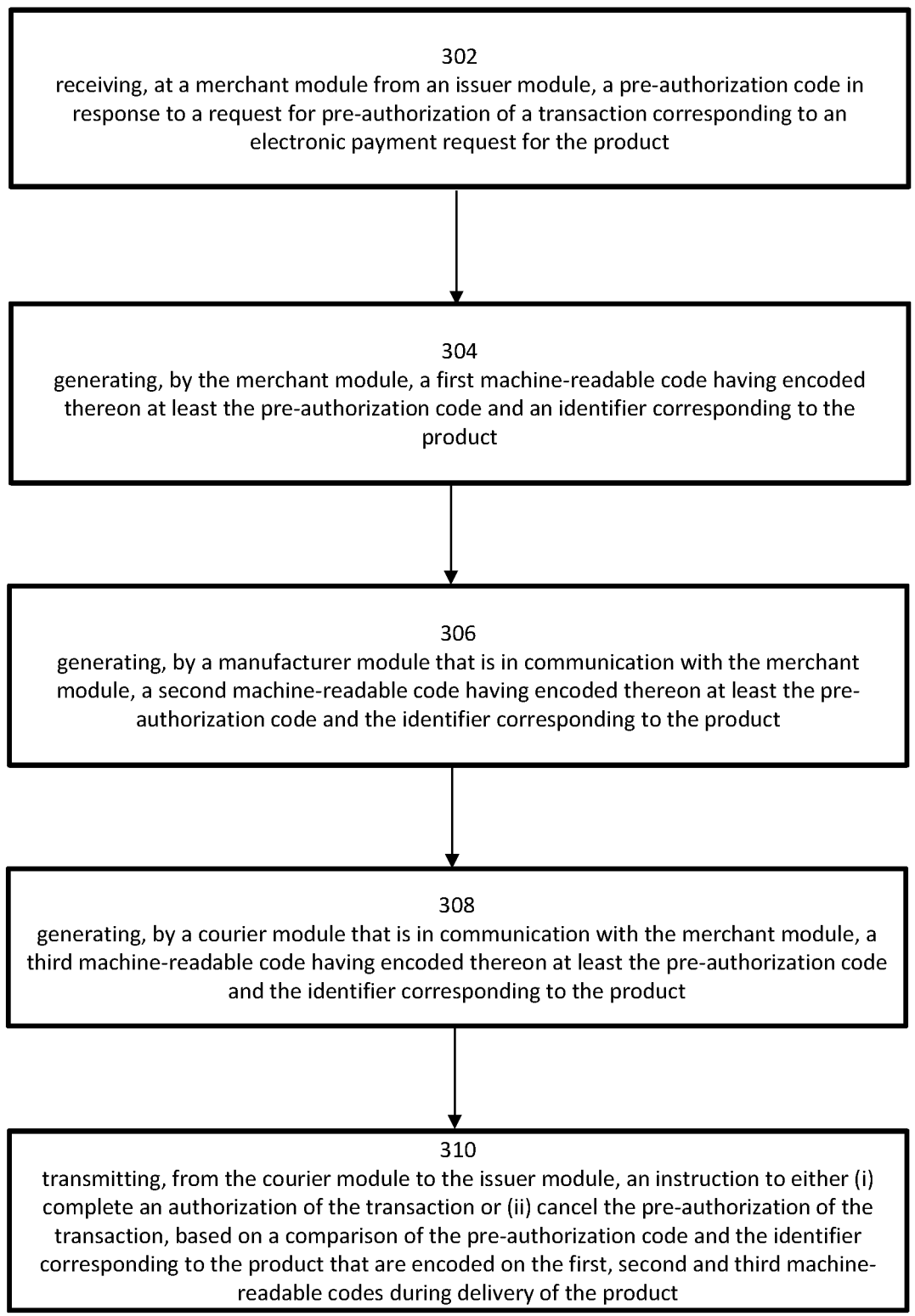
FIG. 3 shows a flow chart illustrating a method for facilitating electronic payment on delivery of a product, according to an example embodiment.

FIG. 3 shows a flow chart illustrating a method for facilitating electronic payment on delivery of a product, according to an example embodiment. At step 302, a pre-authorization code is received at a merchant device from an issuer device in response to a request for pre-authorization of an electronic transaction corresponding to an electronic payment request for the product. At step 304, the merchant device generates a first machine-readable code having encoded thereon at least the pre-authorization code and an identifier corresponding to the product. At step 306, a manufacturer device that is in communication with the merchant device generates a second machine-readable code having encoded thereon at least the pre-authorization code and the identifier corresponding to the product.

At step 308, a courier device that is in communication with the merchant device generates a third machine-readable code having encoded thereon at least the pre-authorization code and the identifier corresponding to the product. At step 310, an instruction to either (i) complete an authorization of the transaction or (ii) cancel the pre-authorization of the transaction is transmitted from the courier device to the issuer device, which may be via the merchant device. The type of instruction that is transmitted is based on a comparison of the pre-authorization code and the identifier corresponding to the product that are encoded on the first, second and third machine-readable codes during delivery of the product.

The instruction to complete the authorization of the transaction is transmitted to the issuer device on a condition that the pre-authorization code and the identifier corresponding to the product that are encoded on the first, second and third machine-readable codes match. Conversely, the instruction to cancel the pre-authorization of the transaction is transmitted to the issuer device on a condition that the pre-authorization code and the identifier corresponding to the product that are encoded on the first, second and third machine-readable codes do not match.

Preferably, during the delivery of the product, a recipient of the product is in possession of the first machine-readable code, the second machine-readable code is initially disposed inside a sealed package containing the product, and a delivery personnel is in possession of the third machine-readable code.

Prior to step 302, the method may further include the steps of (a) receiving the electronic payment request for the product at the merchant device, and (b) transmitting the request for pre-authorization of the transaction corresponding to the electronic payment request for the product from the merchant device to the issuer device.

Prior to step 306, the method may further include transmitting, from the merchant device to the manufacturer device, the pre-authorization code, the identifier corresponding to the product, and (optionally) information corresponding to the delivery of the product. In addition to the pre-authorization code and the identifier corresponding to the product, the generated second machine-readable code may have the information corresponding to the delivery of the product further encoded thereon.

Likewise, prior to step 308, the method may further include transmitting, from the merchant device to the courier device, the pre-authorization code, the identifier corresponding to the product, and (optionally) the information corresponding to the delivery of the product. In addition to the pre-authorization code and the identifier corresponding to the product, the generated third machine-readable code may have the information corresponding to the delivery of the product further encoded thereon.

Steps 304, 306 and 308 may be performed sequentially, in parallel or in any order (e.g. step 308 before 304 and 306). In an exemplary implementation, the first, second and third machine-readable codes are QR codes.

Prior to step 302, the method may further include receiving, at the merchant device, the information corresponding to the delivery of the product. During step 304, the merchant device may further encode the information corresponding to the delivery of the product on the first machine-readable code. Accordingly, transmitting the instruction to either (i) complete the authorization of the transaction or (ii) cancel the pre-authorization of the transaction is also based on a comparison of the information corresponding to the delivery of the product that is encoded on the first, second and third machine-readable codes during the delivery of the product (i.e. in addition to the pre-authorization code and the identifier corresponding to the product).

Prior to step 310, the method may further include comparing, using a mobile delivery device that is in communication with the courier device, the pre-authorization code and the identifier corresponding to the product that are encoded on the first, second and third machine-readable codes during the delivery of the product. Thereafter, a result of the comparison is transmitted from the mobile delivery device to the courier device.

Figure 4:
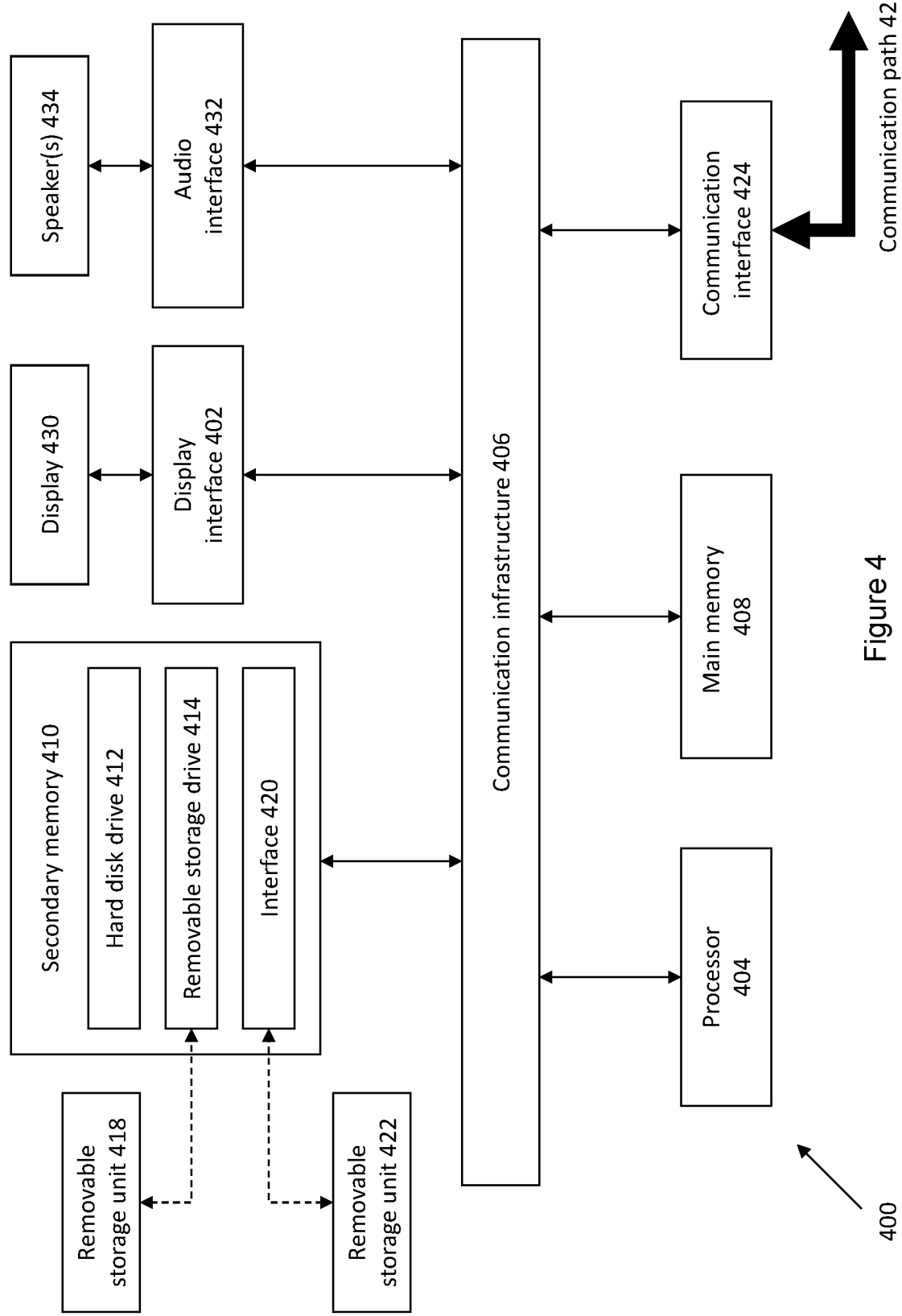
FIG. 4 shows a schematic diagram of a computer device or computer system suitable for realizing at least one or more components of the system for facilitating electronic payment on delivery of a product and/or executing one or more of the steps of the method for facilitating electronic payment on delivery of a product.

FIG. 4 shows a schematic diagram of a computer device or computer system 400 suitable for realizing at least one or more of the merchant device 202, the manufacturer device 204, the courier device 206, and the issuer device 208 and/or executing one or more of the steps of the method 300. The following description of the computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a hard disk drive 412, which may be a hard disk drive, a solid state drive or a hybrid drive and/or a removable storage drive 414, which may include a magnetic tape drive, an optical disk drive, a solid state storage drive (such as a USB flash drive, a flash memory device, a solid state drive or a memory card), or the like. The removable storage drive 414 reads from and/or writes to a removable storage unit 418 in a well-known manner. The removable storage unit 418 may include magnetic tape, optical disk, non-volatile memory storage medium, or the like, which is read by and written to by removable storage drive 414. As will be appreciated by persons skilled in the relevant art(s), the removable storage unit 418 includes a computer readable storage medium having stored therein computer executable program code instructions and/or data.

In an alternative implementation, the secondary memory 410 may additionally or alternatively include other similar means for allowing computer programs or other instructions to be loaded into the computing device 400. Such means can include, for example, a removable storage unit 422 and an interface 420. Examples of a removable storage unit 422 and interface 420 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 422 and interfaces 420 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments, the communication interface 424 permits data to be transferred between the computing device 400 and a data communication network, such as a public data or private data communication network. The communication interface 424 may be used to exchange data between different computing devices 400 which such computing devices 400 form part an interconnected computer network. Examples of a communication interface 424 can include a modem, a network interface (such as an Ethernet card), a communication port (such as a serial, parallel, printer, GPIB, IEEE 1394, RJ45, USB), an antenna with associated circuitry and the like. The communication interface 424 may be wired or may be wireless. Software and data transferred via the communication interface 424 are in the form of signals which can be electronic, electromagnetic, optical or other signals capable of being received by communication interface 424. These signals are provided to the communication interface via the communication path 426.

As shown in FIG. 4, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage unit 418, removable storage unit 422, a hard disk installed in hard disk drive 412, or a carrier wave carrying software over communication path 426 (wireless link or cable) to communication interface 424. Computer readable storage media refers to any non-transitory tangible storage medium that provides recorded instructions and/or data to the computing device 400 for execution and/or processing. Examples of such storage media include magnetic tape, CD-ROM, DVD, Blu-ray™ Disc, a hard disk drive, a ROM or integrated circuit, a solid state drive (such as a USB flash drive, a flash memory device, a solid state drive or a memory card), a hybrid drive, a magneto-optical disk, or a computer readable card such as a PCMCIA card and the like, whether or not such devices are internal or external of the computing device 400. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 408 and/or secondary memory 410. Computer programs can also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the hard disk drive 412, or the interface 420. Alternatively, the computer program product may be downloaded to the computer system 400 over the communications path 426. The software, when executed by the processor 404, causes the computing device 400 to perform functions of embodiments described herein.

It is to be understood that the embodiment of FIG. 4 is presented merely by way of example. Therefore, in some embodiments one or more features of the computing device 400 may be omitted. Also, in some embodiments, one or more features of the computing device 400 may be combined together. Additionally, in some embodiments, one or more features of the computing device 400 may be split into one or more component parts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for facilitating electronic payment on delivery of a product, comprising:
   a merchant device in communication with a manufacturer device associated with a manufacturer and in communication with a courier device associated with a courier service, wherein the merchant device is configured to:
   receive, from an issuer device that is associated with an issuer of a payment card and in communication with the merchant device, a pre-authorization code in response to a request for pre-authorization of a transaction corresponding to an electronic payment request for the product, wherein pre-authorization comprises authorizing the transaction associated with an electronic payment for purchase of at least one product from a merchant and withholding funds corresponding to payment for the purchase as unavailable until an instruction to complete an authorization of the transaction or cancel the pre-authorization of the transaction is received;

generate a machine-readable customer code having encoded thereon at least the pre-authorization code and an identifier corresponding to the product, wherein the machine-readable customer code is transmitted to a customer associated with the transaction;

transmit at least the pre-authorization code and the identifier to the manufacturer device and the courier device, wherein the manufacturer device is configured to generate a machine-readable manufacturer code having encoded thereon at least the pre-authorization code and the identifier corresponding to the product, and wherein the courier device is configured to generate a machine-readable shipment code having encoded thereon at least the pre-authorization code and the identifier corresponding to the product; and cause a code reader to match the machine-readable customer code, the machine-readable manufacturer code, and the machine-readable shipment code on delivery of the product, wherein the code reader is configured to automatically trigger a completion of the authorization on condition that the machine-readable customer code, the machine-readable manufacturer code, and the machine-readable shipment code match with each other, by communicating the match to the courier service and automatically trigger a void request to be sent to the courier service on condition that the machine-readable customer code, the machine-readable manufacturer code and the machine-readable shipment code fail to match on delivery of the product, the void request causing a cancelation of the pre-authorization of the transaction and a release of withheld funds into an account associated with the customer.

2. The system as claimed in claim 1, wherein during the delivery of the product, a recipient of the product is in possession of the machine-readable customer code, the machine-readable manufacturer code is initially disposed inside a sealed package comprising the product, and a delivery personnel is in possession of the machine-readable shipment code; and further comprising:

compare, by the code reader in communication with the courier device, the pre-authorization code and the identifier corresponding to the product that are encoded on the machine-readable customer code, the machine-readable manufacturer code, and the machine-readable shipment code during the delivery of the product; and transmit a result of the comparison to the merchant device.

3. The system as claimed in claim 1, wherein the merchant device is further configured to:

receive the electronic payment request for the product; and transmit, to the issuer device, the request for pre-authorization of the transaction corresponding to the electronic payment request for the product.

4. The system as claimed in claim 1, wherein the merchant device is further configured to transmit, to the manufacturer device:

the pre-authorization code;
the identifier corresponding to the product; and
information corresponding to the delivery of the product, and wherein the manufacturer device is further configured to encode the information corresponding to the delivery of the product on the machine-readable manufacturer code.

5. The system as claimed in claim 1, wherein the merchant device is further configured to transmit, to the courier device:

the pre-authorization code;
the identifier corresponding to the product; and
information corresponding to the delivery of the product, and wherein the courier device is further configured to encode the information corresponding to the delivery of the product on the machine-readable shipment code.

6. The system as claimed in claim 4, wherein the merchant device is further configured to:

receive the information corresponding to the delivery of the product; and encode the information corresponding to the delivery of the product on the machine-readable customer code, and wherein the courier device is further configured to transmit the instruction to either (i) complete the authorization of the transaction or (ii) cancel the pre-authorization of the transaction based on a comparison of the information corresponding to the delivery of the product that is encoded on the machine-readable customer code, the machine-readable manufacturer code and the machine-readable shipment code.

7. The system as claimed in claim 1, wherein an instruction to complete the authorization of the transaction is transmitted to the issuer device on a condition that the pre-authorization code and the identifier corresponding to the product that are encoded on the machine-readable customer code, the machine-readable manufacturer code and the machine-readable shipment code match, and wherein the instruction to cancel the pre-authorization of the transaction is transmitted to the issuer device on a condition that the pre-authorization code and the identifier corresponding to the product that are encoded on the machine-readable customer code, the machine-readable manufacturer code and the machine-readable shipment code do not match.

8. The system as claimed in claim 1, further comprising: the code reader in communication with the courier device, wherein the code reader is configured to:

compare the pre-authorization code and the identifier corresponding to the product that are encoded on the machine-readable customer code, the machine-readable manufacturer code, and the machine-readable shipment code during the delivery of the product; and transmit a result of the comparison to the courier device.

9. The system as claimed in claim 1, wherein the machine-readable customer code is a customer QR code, the machine-readable manufacturer code is a manufacturer QR code, and the machine-readable shipment code is a shipment QR code, and wherein the code reader is a QR code reader and further comprising:

scanning, by the QR code reader, the customer QR code, the manufacturer QR code and the shipment QR code in presence of the customer.

10. A method for facilitating electronic payment on delivery of a product, comprising:

receiving, at a merchant device from an issuer device, a pre-authorization code in response to a request for pre-authorization of a transaction corresponding to an electronic payment request for the product, the pre-authorization of the transaction comprises authorizing the transaction associated with an electronic payment for purchase of the product from a merchant and withholding funds corresponding to payment for the purchase as unavailable until an instruction to complete an authorization of the transaction or cancel the pre-authorization of the transaction is received;

generating, by the merchant device, a machine-readable customer code having encoded thereon at least the pre-authorization code and an identifier corresponding to the product;

transmitting the machine-readable customer code to a customer associated with the transaction;

transmitting at least the pre-authorization code and the identifier to a manufacturer device associated with a manufacturer that is in communication with the merchant device, wherein the manufacturer device generates a machine-readable manufacturer code having encoded thereon at least the pre-authorization code and the identifier corresponding to the product;

transmitting at least the pre-authorization code and the identifier to a courier device that is in communication with the merchant device, wherein the courier device generates a machine-readable shipment code having encoded thereon at least the pre-authorization code and the identifier corresponding to the product;

causing a code reader to match the machine-readable customer code, the machine-readable manufacturer code, and the machine-readable shipment code on delivery of the product;

automatically trigger a completion of the authorization on condition that the machine-readable customer code, the machine-readable manufacturer code, and the machine-readable shipment code match with each other, by communicating the match to the courier service; and automatically trigger a void request to be sent to the courier service on condition the machine-readable customer code, the machine-readable manufacturer code and the machine-readable shipment code fail to match on the delivery of the product, the void request causing a cancelation of the pre-authorization of the transaction and a release of withheld funds into an account associated with the customer.

11. The method as claimed in claim 10, wherein during the delivery of the product, a recipient of the product is in possession of the machine-readable customer code, the machine-readable manufacturer code is initially disposed inside a sealed package comprising the product, and a delivery personnel is in possession of the machine-readable shipment code; and further comprising:

comparing, by the code reader in communication with the courier device, the pre-authorization code and the identifier corresponding to the product that are encoded on the machine-readable customer code, the machine-readable manufacturer code, and the machine-readable shipment code during the delivery of the product; and transmitting a result of comparison to the merchant device.

12. The method as claimed in claim 10, further comprising:

receiving, at the merchant device, the electronic payment request for the product; and transmitting, from the merchant device to the issuer device, the request for pre-authorization of the transaction corresponding to the electronic payment request for the product.

13. The method as claimed in claim 10, further comprising:

transmitting, from the merchant device to the manufacturer device, the pre-authorization code, the identifier corresponding to the product, and information corresponding to the delivery of the product, wherein the machine-readable manufacturer code has the information corresponding to the delivery of the product further encoded thereon.

14. The method as claimed in claim 10, further comprising:

transmitting, from the merchant device to the courier device, the pre-authorization code, the identifier corresponding to the product, and information corresponding to the delivery of the product, wherein the machine-readable shipment code has the information corresponding to the delivery of the product further encoded thereon.

15. The method as claimed in claim 13, further comprising:

receiving, at the merchant device, the information corresponding to the delivery of the product; and encoding the information corresponding to the delivery of the product on the machine-readable customer code, wherein transmitting the instruction to either (i) complete the authorization of the transaction or (ii) cancel the pre-authorization of the transaction is also based on a comparison of the information corresponding to the delivery of the product that is encoded on the machine-readable customer code, the machine-readable manufacturer code and the machine-readable shipment code during the delivery of the product.

16. The method as claimed in claim 10, wherein an instruction to complete the authorization of the transaction is transmitted to the issuer device on a condition that the pre-authorization code and the identifier corresponding to the product that are encoded on the machine-readable customer code, the machine-readable manufacturer code and the machine-readable shipment code match, and wherein the instruction to cancel the pre-authorization of the transaction is transmitted to the issuer device on a condition that the pre-authorization code and the identifier corresponding to the product that are encoded on the machine-readable customer code, the machine-readable manufacturer code and the machine-readable shipment code do not match.

17. The method as claimed in claim 10, further comprising:

comparing, using the code reader that is in communication with the courier device, the pre-authorization code and the identifier corresponding to the product that are encoded on the machine-readable customer code, the machine-readable manufacturer code, and the machine-readable shipment code during the delivery of the product; and transmitting a result of the comparison from the code reader to the courier device.

18. The method as claimed in claim 10, wherein the machine-readable customer code is a customer QR code, the machine-readable manufacturer code is a manufacturer QR code, and the machine-readable shipment code is a shipment QR code, and wherein the code reader is a QR code reader and further comprising:

scanning, by the QR code reader, the customer QR code, the manufacturer QR code and the shipment QR code in presence of the customer.

19. A non-transitory computer-readable medium having stored thereon program instructions for facilitating electronic payment on delivery of a product, the instructions causing at least one processor to:

receive, from an issuer device that is in communication with a merchant device, a pre-authorization code in response to a request for pre-authorization of a transaction corresponding to an electronic payment request for the product, wherein pre-authorization comprises authorizing the transaction associated with an electronic payment for purchase of at least one product from a merchant and withholding funds corresponding to payment for the purchase as unavailable until an instruction to complete an authorization of the transaction or cancel the pre-authorization of the transaction is received;

generate a machine-readable customer code having encoded thereon at least the pre-authorization code and an identifier corresponding to the product, wherein the machine-readable customer code is transmitted to a customer associated with the transaction;

transmit at least the pre-authorization code and the identifier to a manufacturer device associated with a manufacturer and the courier device associated with a courier service, wherein the manufacturer device is configured to generate a machine-readable manufacturer code having encoded thereon at least the pre-authorization code and the identifier corresponding to the product, and wherein the courier device is configured to generate a machine-readable shipment code having encoded thereon at least the pre-authorization code and the identifier corresponding to the product;

cause a code reader to match the machine-readable customer code, the machine-readable manufacturer code, and the machine-readable shipment code on delivery of the product match;

automatically trigger a completion of the authorization on condition that the machine-readable customer code, the machine-readable manufacturer code, and the machine-readable shipment code match with each other, by communicating the match to the courier service; and automatically trigger a void request to be sent to the courier service on condition the machine-readable customer code, the machine-readable manufacturer code and the machine-readable shipment code on the delivery of the product fail to match on the delivery of the product, the void request causing a cancellation of the pre-authorization of the transaction and a release of withheld funds into an account associated with a customer.

20. The non-transitory computer-readable medium of claim 19, wherein during the delivery of the product, a recipient of the product is in possession of the machine-readable customer code, the machine-readable manufacturer code is initially disposed inside a sealed package comprising the product, and a delivery personnel is in possession of the machine-readable shipment code; and wherein the instructions further cause the at least one processor to:

compare, by the courier device, the pre-authorization code and the identifier corresponding to the product that are encoded on the machine-readable customer code, the machine-readable manufacturer code, and the machine-readable shipment code during the delivery of the product; and transmit a result of the comparison to the merchant device.

* * * * *